United States Patent [19]

Mitchell et al.

[11] Patent Number: 6,010,595
[45] Date of Patent: Jan. 4, 2000

[54] MULTIPLY PAPER COMPRISING A MIXTURE OF CELLULOSE FIBERS AND CELLULOSE ESTER FIBERS HAVING IMPARTED SOFTENING PROPERTIES AND A METHOD OF MAKING THE SAME

[75] Inventors: Melvin Glenn Mitchell; William Henry Kirk, both of Kingsport; Charles Kelly Crosswhite, Blountville; Paul Jay Kennedy, Kingsport, all of Tenn.

[73] Assignee: Eastman Chemical Company, Kingsport, Tenn.

[21] Appl. No.: 08/729,462

[22] Filed: Oct. 11, 1996

[51] Int. Cl.[7] .............................. D21F 11/00; D21H 13/06
[52] U.S. Cl. ....................... 162/129; 162/146; 162/157.6; 162/141; 162/123
[58] Field of Search .................................... 162/129, 146, 162/157.6, 157.7, 132, 141, 142, 157.1, 123; 428/191, 211, 201, 292.4

[56] References Cited

U.S. PATENT DOCUMENTS

| | | | |
|---|---|---|---|
| 1,631,750 | 6/1927 | Mcintosh | 162/147 |
| 1,829,585 | 10/1931 | Dreyfus et al. | 162/146 |
| 2,069,763 | 2/1937 | Bartlett | 162/146 |
| 2,887,429 | 5/1959 | Griggs et al. | 162/146 |
| 2,992,156 | 7/1961 | Schulwitz | 162/157.6 |
| 3,954,554 | 5/1976 | Curry et al. | 162/104 |
| 4,040,856 | 8/1977 | Litzinger | 106/170 |
| 4,047,862 | 9/1977 | Keith | 425/8 |
| 4,460,647 | 7/1984 | Keith | 428/369 |
| 4,913,773 | 4/1990 | Knudsen et al. | 162/129 |
| 5,213,883 | 5/1993 | Mehta | 428/224 |
| 5,631,076 | 5/1997 | Ellery et al. | 428/311.71 |

FOREIGN PATENT DOCUMENTS

| | | |
|---|---|---|
| 52-096208 | 8/1977 | Japan . |
| 52-096231 | 8/1977 | Japan . |

*Primary Examiner*—Jose Fortuna
*Attorney, Agent, or Firm*—Charles R. Martin; Harry J. Gwinnell

[57] ABSTRACT

A multiply paper structure having at least one ply containing a mixture of cellulose ester fibers and cellulose fibers, having improved softening properties, readily moldable at moderate temperatures, printable with ordinary inks, and having adequate stiffness for applications requiring a desired stiffness, and a process for making the same.

9 Claims, No Drawings

MULTIPLY PAPER COMPRISING A MIXTURE OF CELLULOSE FIBERS AND CELLULOSE ESTER FIBERS HAVING IMPARTED SOFTENING PROPERTIES AND A METHOD OF MAKING THE SAME

This application claims the benefit of the provisional application filed under Docket 70325, Serial No. unknown filed Sep. 16, 1996.

TECHNICAL FIELD

This invention relates generally to a multiply paper or paperboard stock, at least one ply comprising a mixture of cellulose ester fibers and cellulose fibers, having improved softening properties, which can be readily moldable at moderate temperatures, can be printed with ordinary inks, and has adequate stiffness for applications requiring a certain desired stiffness. The cellulose ester-containing ply is treated with sufficient plasticizer to impart softening characteristics to the cellulose ester fibers.

BACKGROUND OF THE INVENTION

Paper, in the form of "boxboard" or "paperboard", has been widely used for such disposable items as drinking cups and containers for liquids, such as milk and fruit juices.

For these applications, paper has the advantages of low toxicity, low cost, printability, biodegradability, and the ease with which it may be formed into the required shapes.

However, untreated paper is not suitable for the above-mentioned applications, because it is permeable to water and other aqueous liquids, and because, in the thickness desirable, it lacks adequate rigidity.

In order to overcome the above-mentioned disadvantages of untreated paper, efforts to reduce its water permeability and increase the stiffness by various methods have been taken, such as coating it with various waxes or plastics such as polyethylene, or by laminating the paper with plastic film. However, these materials do not accept ordinary printing inks, so it has been necessary to either use special, more expensive, inks on the coated material, or to print the paper before coating it and, therefore necessarily, to use a transparent coating.

Furthermore, the above-mentioned past efforts to solve the problems of high water permeability and low rigidity have rendered the resultant paper product non-biodegradable. Accordingly, there is the need for a multiply paper product having the above-mentioned desired characteristics, which is yet biodegradable.

U.S. application Ser. No. 08/640,401 describes paper made with cellulose acetate staple fiber. In addition, cellulose acetate fibers have been combined with cellulosic pulp in the manufacture of paper products as disclosed in U.S. Pat. Nos. 3,057,755, 4,731,091, 4,040,856 and 5,102,501 and Chemical Abstracts 73:121691s.

U.S. application Ser. No. 08/506,986 describes cellulosic paper made with fibers having an inner core of cellulose acetate. U.S. Pat. No. 4,040,856 to Litzinger contains an extrusion process for making cellulose acetate fibers for papermaking. The fibers are suitable for direct addition to conventional papermaking methods. Two related patents, U.S. Pat. Nos. 4,047,862 and 4,460,647 by Keith, disclose a cellulose acetate fiber for use in paper applications which is produced by precipitation of cellulose acetate from a dope under high shear conditions. In U.S. Pat. No. 5,213,883 by Mehta, a decorative sheet is disclosed having 1 to 20 weight percent cellulose acetate fibers added to cellulose pulp and $TiO_2$. Japanese Patent. Nos. 52,096,208 and 52,096,231 to Shiyuuichi et al. are for another form of cellulose acetate fibers which are mixed with staple fibers for making into paper.

U.S. application Ser. No. 08/550,474 describes films made from paper containing cellulose ester fiber. The films of that invention are made from cellulose ester-containing paper such as that described in U.S. application Ser. No. 08/640,401 and U.S. application Ser. No. 08/506,986 discussed above which has been treated with a sufficient amount of a cellulose ester plasticizer, then subjected to heat and pressure.

All of the foregoing references deal with the preparation of single-ply sheets composed of cellulose ester containing paper, which usually include plasticizer.

It is therefore an object of the present invention to provide a multiply paper comprising at least one ply made of a mixture of cellulose fibers and cellulose ester fibers, having imparted softening characteristics, and a method of making the same.

It is another object of the present invention to provide a multiply paper in which the plies are integral with the paper web. That is, the multiply paper is formed from multiple plies of wet fibers integrally connected in the wet state, and prepared on conventional paper-making machines which are used for making multiply paper, rather than being laminates in which two or more separate materials are combined by adhesives or thermal or purely mechanical means (i.e., rather than a multiply product formed from dry sheets).

It is another object of the present invention to provide a multiply paper product that can be printed either on the all-cellulose plies or on the cellulose ester-containing ply, using ordinary inks.

It is another object of the present invention to provide a multiply paper product having the above-mentioned characteristics while having excellent biodegradability. The multiply paper of the present invention is also impermeable to penetration by aqueous liquids at ambient temperatures.

SUMMARY OF THE INVENTION

The present invention provides paper or paperboard comprising two or more plies, at least one of which is composed of a mixture of cellulose fibers and cellulose ester fibers, and a method for making the same.

The present invention also relates to paperboard stock comprising a first paper ply or paperboard ply made from cellulose pulp fiber and a second ply consisting of paper made from a mixture of cellulose fiber and cellulose ester fibers having imparted softening properties.

The present invention also relates to a multiply sheet of paper or paperboard, at least one ply of which is composed of a mixture of cellulose fibers and cellulose ester fibers, having imparted softening properties and which therefore can be converted into molded objects. When the cellulose ester-containing ply is positioned on the outside of the multiply, the material can be heat-sealed, either to itself or to ordinary paper or paperboard, polyethylene, polypropylene, polyester, and the like.

The present invention also relates to multiply paper comprising two or more plies, at least one of which is composed of mixed cellulose fibers and cellulose acetate fibers, in which the cellulose acetate-containing ply has been treated with a plasticizer in an amount to impart softening characteristics to the cellulose acetate fibers.

DETAILED DESCRIPTION OF THE INVENTION

The above-mentioned objects of the present invention are accomplished by preparing multiply paper in which at least one of the plies comprises a mixture of cellulose fibers and cellulose ester fibers.

The structures of this invention include both the categories of "paper" and "paperboard", provided only that they contain at least two plies, at least one of which is composed of a mixture of cellulose fibers and cellulose ester fibers. According to G. A. Smook, "Handbook for Pulp and Paper Technologists", 2nd ed., p. 297, paperboard can be loosely defined as "stiff and thick paper", but the ISO has set the specification for paperboard at 224 g/m² or more, while lighter stock is referred to as "paper". Various categories of paperboard which are particularly applicable to this invention are linerboard, foodboard, and folding boxboard (carton board).

The ply or plies of the products of the present invention which are composed of ordinary paper include paper derived from any of the common pulping processes (Smook loc. cit., p. 36), including mechanical, hybrid, and chemical. Paper made by one of the variations of the kraft process is most commonly used in paperboard.

The amount of cellulose ester fibers can range from 3 wt % to 100 wt %, preferably from 10 wt % to 100 wt %, more preferably from 30 wt % to 90 wt %, and most preferably from 50 wt % to 84 wt %, based upon the total weight of the cellulose fibers and the cellulose ester fibers in the ply containing the cellulose ester fibers. The remainder portion of the ply is composed of conventional cellulose paper pulp fibers (cellulose fibers) and conventional additives. The remaining portion of the multiply paper consists of one or more plies of conventional paper which may be prepared from different types of pulp fibers. For example, a high yield kraft pulp can be used for an inner layer which would be covered with a ply made from low yield unbleached or bleached, and well refined, kraft pulp to enhance the appearance of the final board. The term "pulp fiber" is defined as fiber that has already been chemically or mechanically treated as desired, and is therefore ready to be made into a sheet or the like.

Additional plies of cellulose ester containing paper may be used, although the amount of this special paper is held to the minimum needed to impart the desired stiffness, moldability, etc., to reduce cost.

The multiply product of the present invention can have imparted softening characteristics. This is accomplished by adding a plasticizer to the ply containing the cellulose ester fibers. The plasticizer softens the ply containing the cellulose ester fibers such that the cellulose ester is made flowable, and therefore made more moldable, more flexible, and less viscous.

When a plasticizer is added to a polymer, e.g., cellulose ester, the flexibility and melt flow characteristics of the polymer increases in two ways. First, the plasticizer reduces intramolecular friction, allowing the polymer chains to slide past each other when a stress, such as bonding, is applied. This is referred to as the Lubricity Theory. Second, the plasticizer swells the polymer chain apart, forming a gel-like substance, which also reduces intramolecular friction, allowing the polymer chains to slip by each other when stress is applied. This is referred to as the Gel Theory.

The plasticizer attaches to the surface of the cellulose ester fibers, and adjusts the melt temperature of the cellulose ester of the cellulose ester fibers. The melt temperature is adjusted according to the plasticizer selected. The plasticizer dissolves the cellulose ester, and therefore permits the cellulose ester to solution bond on contact, i.e., permits the cellulose ester to bond to surrounding cellulose ester and cellulose to form a film.

After the plasticizer is added, the multiply structure can then be converted, i.e., heat and pressure may be applied, to thermoform the multiply structure, whereby a continuous film is formed from the cellulose ester containing ply. The application of heat and pressure can be conducted in a platen press at a pressure range of from 150 to 300 psi and at a temperature range of from 100° C. to 300° C.

The cellulose ester-containing pulp fiber used in the process of the present invention requires no special treatment, and is used in conventional paper-forming machines.

The process of making the above-mentioned multiply paper is detailed below.

In *An Introduction to the Theory and Practice of Multiply Forming* by Brian Attwood and Graham Moore, 1994, four conventional ways are described for producing a multiply product, which can be utilized for the present invention, detailed below.

One way comprises forming plies separately and then bringing the plies together using conventional paper machine equipment. A second way comprises laying a second layer on top of a first layer, and dewatering through the first layer. A third way comprising laying a second layer on top of a previously formed layer and upwardly dewatering to remove water from the top layer. A fourth way comprises forming a number of plies simultaneously from what is known as a stratified headbox. Each way requires forming a multiply structure from plies of wet fibers rather than a multiply structure formed from dry sheet plies. That is, the plies are joined in a wet condition.

The simplest in conception is the conventional Fourdrinier paper forming machine, which is equipped with one or more secondary headboxes, each of which is capable of feeding a different grade or type of pulp.

The main standard components of the Fourdrinier forming unit are the headbox and the forming table, including dewatering elements and equipment for improving formation. The function of the headbox is to provide a level and stable jet across the width of the Fourdrinier machine and to produce a well dispersed fibrous suspension.

The Fourdrinier machine disperses the components in the fibrous suspension uniformly, and then removes the water from the fibrous suspension. Therefore a sheet of paper is simply a dispersion of components. A paper machine, in its entirety, comprises a headbox, a Fourdrinier table, a press section in which water is squeezed out, and a dryer section.

The headbox is supplied with stock from a fan pump and the duty of which is to supply a even, level flow of fibrous suspension at a known velocity onto the forming screen of the Fourdrinier machine or a twin-wire former or onto a rotary former, such as a short former. The term headbox is also used for a supply box used for feeding the fibrous suspension to the vat of a cylinder mould machine.

Multichannel headboxes have also been developed which permit feeding different types or grades of pulp to form the plies of the multiply simultaneously, resulting in a multiply structure in which the plies are integral with the paper web. This is the preferred method of the present invention.

Alternatively, separate Fourdrinier forming sections may be used, with the different types of paper webs being combined at the wet end, or the Fourdrinier may be used to produce one ply, while the other plies are produced on a series of cylinder molds, or cylinder formers may be arranged in tandem to produce multiply paper. Again, plies are thus formed simultaneously.

The process of making the multiply paper of the present invention comprises first mixing cellulose fibers and cellulose ester fibers, all in slurry form, in a hydrapulper. Conventional fillers may be added to the mixtures as desired. The mixture is then forwarded to a refiner chest and then to the headbox of a Fourdrinier machine.

For forming a multiply structure, a multichannel headbox is utilized as the preferred method, wherein each channel contains the desired composition of pulp, to form a plurality of plies simultaneously, resulting in a multiply product having different components in each ply. These plies are plies of wet fibers which are integrally connected in the wet state to form the multiply product.

These multiple plies are then forwarded to a press section, then to a first dryer section, then to a size press, and then to a second dryer section, and then to a calendar stack, if calendaring is desired, to complete the paper making process. As aforementioned, these sections are conventional parts of a paper machine, and the process steps can vary depending upon the particular paper machine utilized.

According to the process of the present invention, the plasticizer may be added at the size press. A conventional size press operates by using rollers. A first roller runs through a bath containing the plasticizer in a desired concentration, and then that roller meters it onto a separate roller, which then meters it onto the ply or the multiply structure. The plasticizer can be added in pure form, however, the preferred embodiment is to use water as a solvent, and thus the plasticizer is added via a solvent solution. Water solvent sizing systems are conventional in the paper industry. The amount of plasticizer desired in the ply is controlled by the concentration of the plasticizer in the bath. One or two side coating of the multiply in any of these configurations can be performed.

When the multiply structure is run through the size press, it picks up 100% of the plasticizer in liquid, and the amount of plasticizer can be adjusted by adjusting the amount of plasticizer in the liquid.

Regarding the drying section of the paper machine, any of the different types of conventional dryers can be used. For example, standard drum dryers can be used, which may be felted or not felted. A flat dryer can be used, where the sheet runs back and forth over rollers and convention air flows through it. Infrared drying can be utilized, as well as gas fired dryers.

The cellulose ester fibers utilized in the present invention can be cellulose acetate fibers. The cellulose acetate fibers are preferably what is commonly referred to as "secondary acetate", in which the acetyl content is between 34 and 41 percent, although more highly acetylated cellulose fibers also fall within the scope of the present invention. They may be derived from standard hardwood or softwood pulp. They may have a variety of cross sections, including a round or trilobal cross section, and they may or may not be surface hydrolyzed or treated.

The thickness and the relative amounts of cellulose and of cellulose ester used in the cellulose ester-containing ply will depend primarily upon the stiffness and thermoformability desired in the final product. For example, a basis weight in the range of from 420 g/m² to 430 g/m², and cellulose acetate in the range of from 70 to 90 weight percent in the top and bottom plies of a three ply sheet will exhibit a stiffness (as measured by the Tabot Method) in the range of from 7280 g to 7750 g, and a smoothness (measured by the Sheffield Method) in the range of from 17 to 31 on the top side, and from 65 to 84 on the wire (bottom) side, after converting in a static press, as described in Example 2 of the present invention. The stretch improved from 3440 units on an unconverted sheet to 5511 units, after converting. A higher concentration of cellulose ester in a ply will give, other factors being equal, a stiffer product which can be thermoformed into objects which retain their shape better than those which contain less cellulose ester. Since cellulose ester will usually be the most expensive component of the final product, economic considerations enter into the balance.

As noted above, the cellulose ester can be cellulose acetate. However, other cellulose esters, particularly cellulose propionate, cellulose acetate-propionate, and cellulose acetate-butyrate are also within the scope of the present invention.

Paper which contains, in addition to the cellulose ester-containing ply or plies, fibers other than cellulose are also within the scope of the present invention. For example, fibers such as fiber glass, polyester, kevlar, rayon and cotton can be used.

Plasticizer may also be applied to the paper by other means in addition to, or in place of, the means aforementioned, such as dip coating or spraying. It is particularly convenient to use conventional paper coating equipment such as that used for the application of conventional finishes to the paper. It is also particularly convenient to apply the plasticizer at the size press. For this purpose, any of the conventional size press configurations described by Smook, loc. cit., pp. 283–286, may be used. Although it has been found that plasticizer will migrate from the all-cellulose plies of the paper into the cellulose acetate-containing ply, it is generally preferable to use a press configuration which permits application of the plasticizer directly to the cellulose ester-containing ply.

Suitable plasticizers include any compositions which are compatible with cellulose ester, and which soften the cellulose ester so that it can be shaped upon the application of heat and pressure. For cellulose acetate, compatible plasticizers include high boiling esters of polyhydric alcohols such as diacetin; triethylene glycol diacetate and triacetin; high boiling esters of carboxylic acids such as alkyl or aryl esters of citric acid, adipic acid, maleic acid and phthalic acid which include dimethyl phthalate and triethyl citrate; organic esters of inorganic acids such as tributyl phosphate, triethyl and tripropyl phosphate, and trichloroethyl phosphate; alkoxy alkyl esters of inorganic acids or of organic polybasic acids such as di(methoxy ethyl)phthalate, di(methoxy ethyladipate), di(methoxy ethyoxy ethyl)adipate and methyl phthalyl ethyl glycolate, ortho- and para-N-ethyl toluene sulfonamides; and high boiling ethers such as both ether or ethylene glycol, methyl ether or ethylene glycol, etc. Preferably the plasticizers are diethyl phthalate, triethyl citrate, Benzoflex 400™, Ketjenflex 8™ (also referred to as KJ-8), Ketjenflex 9S™, Eastman 240™, triacetin, triacetin/1–3 percent cellulose acetate solution and triacetin/diethyl phthalate. If the cellulose ester-containing ply is to be in contact with food, it is obvious that nontoxic plasticizers must be used. The plasticizers can be water soluble. Flame retardant plasticizers can also be selected.

The trademarked products are specially formulated chemicals used as plasticizers for cellulose ester. Benzoflex 400™, available from Velsicol Chemical Corporation of Rosemont, Ill., is polypropylene glycol-dibenzoate ester of polyoxy(methyl-1,2-ethanediyl)-benzoyl-(benzoyloxy). The Ketjenflex products are available from Akzo Nobel Chemicals, Inc. of Dobbs Ferry, N.Y. Ketjenflex $_8$™ is 60 weight percent N-ethyl-2-methylbenzenesulfonamide and 40 weight percent N-ethyl-4-methylbenzenesulfonamide. Ketjenflex $_9$S™ is 60 percent 4-methylbenzenesulfonamide and 40 percent 2-methylbenzenesulfonamide. Eastman 240™, available from Eastman Chemical Co. of Kingsport, Tenn., is 72 weight percent diethyl phthalate, 22 weight percent dimethyl phthalate and 6 weight percent 2,2,3-trimethyl-1,3-pentanediol diisobutyrate.

The sufficient amount of plasticizer is that which is enough to impart the desired stiffness, permeability, and printability to the cellulose ester-containing ply of the paper after heat and pressure is applied to thermoform the cellulose ester-containing ply. The amount of plasticizer utilized depends upon the plasticizer used, the cellulose ester involved, and the interrelated temperature, time, and pressures to be used in thermoforming. As shown in Example 3 below, the most critical variables are press temperature and pressure. Press temperature preferably ranges from 100° C. to 300° C. Pressure preferably ranges from 150 PSI to 300 PSI. Press time preferably ranges from 30 seconds to 5 minutes. The precise temperatures and pressures required will vary, depending upon the plasticizer and the amount of plasticizer used.

The amount of plasticizer is preferably in the range of 20 to 150 percent of the weight of the cellulose ester content of that ply. More preferably, the amount of plasticizer is in the range of 45 to 70 weight percent of the cellulose ester content of that ply of the paper. Too little plasticizer will result in a sheet which requires excessive heat and pressure to thermoform. On the other hand, excess plasticizer may bleed into the all-cellulose layers of that sheet and alter its appearance. A good resultant sheet is one having high gloss, no yellowing, and no blotchy appearance, i.e., no areas of the sheet left unconverted.

The following examples are illustrative of the present invention, however, the present invention is not limited by the following examples.

EXAMPLE 1

Two-ply bleached boxboard containing cellulose acetate in a thin top layer was prepared on a 36" pilot Fourdrinier paper machine.

Bottom ply pulp was prepared from 95% Prince George wood pulp (oven dry); 5% of precipitated calcium carbonate was added to this layer at the wet end of the paper machine. Seven hundred pounds of this pulp, which had been refined to freeness of 362 CS mL was pumped to the paper machine chest for the bottom layer.

Top ply pulp was prepared from 30% Prince George wood pulp (oven dry) and 70% of surface hydrolyzed cellulose acetate fibers. The wood pulp was dispersed in a hydrapulper for 15 min then pumped to the refiner chest where the cellulose acetate fibers were added. The consistency of the feed to the refiner was 2.65%. The pulp was refined to 226 Canadian Standard (CS) mL freeness and pumped to the paper machine chest (secondary headbox) for the top layer. Sodium bicarbonate was added to the chest at a rate of 20 lb/ton.

Run conditions for the machine were: Machine speed, 60 ft/min; primary headbox consistency 0.68%; 1st press pounds per linear inch (pli) 80; 2nd press, pli 180; 1st dryer section psi 60; size press, pli 80; size press starch, 22 lb/ton; 2nd dryer section psi 60; calendar nips, 4 @200 pli. The secondary headbox consistency was 0.58%; the CS Freeness was 110 mL, the pH, 7.0.

The paper was coated in the size press with a wash coat which consisted of 45 lbs of clay, 18.75 lbs of ethylated starch; 1 pint of castor oil; 26 lbs of Scripset liquid; 15.75 lbs of Dow 638 Latex (dry); ½ pint of Foam Master Defoamer; and ½ pint of Dispex N40 Seqna.

The resulting paper had basis weight 152 lbs/3000 ft$^2$; the caliper was 14.4 mils, the stiffness (Tabor Units) 72 g (machine direction) or 36 g (cross direction). The average burst strength (top) was 65.7 psi; (wire), 63.2 psi; smoothness, Sheffield units: top, 396; wire, 389.

EXAMPLE 2

A 12-in.×12-in. sheet of two-ply paper, one ply of which contained cellulose acetate fibers, prepared from 30% Prince George wood pulp (oven dry) and 70% of surface hydrolyzed cellulose acetate fibers, was dipped into a solution of 20% Ketjenflex™8 (KJ-8) plasticizer in isopropyl alcohol. The other ply is made of cellulose (wood pulp). The sheet was blotted to remove excess solution, then run through rollers to aid dispersion of the plasticizer. The paper was placed between plates, with 200 psi of pressure applied. The temperature of the bottom platen was 135° C., of the top platen, 125° C. After 20 min cure time, the pressure and heat were removed and the sheet was allowed to cool for 10 min. The resulting sheet could be shaped by the application of heat and pressure. Either side could be printed with ordinary inks.

EXAMPLE 3

Two-ply bleached boxboard containing cellulose acetate in a thin top layer was prepared on a 36" pilot Fourdrinier paper machine.

Bottom ply pulp was prepared from 95% Prince George softwood pulp (oven dry); 5% of precipitated calcium carbonate was added to this layer at the wet end of the paper machine. Twelve hundred pounds of this pulp, which had been refined to a freeness of 350 ml CSF (freeness is the quantitative value of drainability of a fibrous suspension) was pumped to the paper machine chest for the bottom layer.

Top ply pulp was prepared from 80% cellulose acetate fibers (precipitated from acetic acid solution) and 20% of Prince George softwood pulp (oven dry) which has been refined to a freeness of 250 ml CSF.

The wet fibers are integrally connected in the wet state.

Wet end additives at the size press consisted of 20 lb/ton of Cargill starch and 2 lb/ton of Hercon™ AKD. Cargill starch is a cationic starch which is acid or base treated to impart a positive charge. Sodium bicarbonate was added to the top ply only at the rate of 20 lb/ton.

The paper was subjected to one calendar nip, no loading. The paper was cut into sheets and saturated by immersion in a solution of Ketjenflex™ 8 (KJ-8) plasticizer in isopropyl alcohol at room temperature.

The sheets were air-dried and plasticization of the cellulose acetate was completed by placing the cellulose acetate-containing side upon the base of a preheated static press, immediately closing the platens of the press, and subjecting the sheet to pressure.

The conditions of press temperature, pressure, heating time, and percent plasticizer in the isopropyl alcohol solution are shown below. The cellulose acetate-containing ply had a smooth, glossy surface in every case.

| SAMPLE | PRESSURE PSI | PRESS TEMP. DEG. C. | PRESS TIME SECONDS | % KJ-8 |
|--------|-------------|---------------------|--------------------|--------|
| 1 | 190 | 200 | 60 | 30 |
| 2 | 210 | 200 | 30 | 30 |
| 3 | 200 | 200 | 30 | 30 |
| 4 | 150 | 300 | 300 | 40 |
| 5 | 190 | 200 | 30 | 30 |
| 6 | 210 | 100 | 30 | 30 |
| 7 | 150 | 300 | 180 | 40 |

The permeability of the above test paper to an aqueous liquid was tested as follows: A 3"×3" section of the test paper was cut from the converted sheet and clamped firmly between the 2 modified round bottom flasks. The flasks used are flasks that are reaction flasks that have been modified by the addition of a side entry port. Diet Pepsi° was added to the flask on the cellulose acetate/cellulose film side of the paper until the flask was filled to the neck. The total exposed area of the film was 3.14 sq. inches (diameter=2 inches). After 2 hours, the soft drink was poured from the container and the heat paper was rinsed with a small amount of water. The coated test paper was viewed for staining, barrier properties (leakage) and outside sheet dryness. The results are shown in the following table.

| SAMPLE[a] | STAINING | LIQUID BARRIER | OTHER SIDE |
|-----------|----------|----------------|------------|
| 1 | slight | no leakage | dry |
| 2 | slight | no leakage | dry |
| 3 | slight | no leakage | dry |
| 4 | none | no leakage | dry |
| 5 | slight | no leakage | damp |
| 6 | moderate | no leakage | wet |
| 7 | none | no leakage | dry |

[a]Sample numbers correspond to those in the preceding table.

In Samples 5 and 6 above, the other side is damp or wet due to condensation, not leakage.

The effect of press temperature and pressure, and pressing time was also studied, using samples plasticized with a 30% solution of KJ™-8 in isopropyl alcohol and dried as previously described.

At a press temperature of 210° C and pressure of 300 psi there were no visible spots, no leakage, and the back side of the paper was dry for press times of both 5 and 30 sec. At lower temperatures and pressures (150°, 100 psi; 180°, 200 psi; 210° C., 100 psi; 150°, 300 psi; or 210°, 300 psi) less satisfactory results were obtained even at press times of 30 sec.

As detailed above, the present invention provides a multiply paper comprising a ply made of a mixture of cellulose fibers and cellulose ester fibers, and a method of making the same. The plies of the multiply paper are integral with the paper web, and can be printed upon, using ordinary inks. The multiply paper of the present invention has increased softening properties, and therefore thermoformable. The multiply paper product has the above-mentioned characteristics, yet is biodegradable.

Various modes of carrying out the present invention will be evident to those skilled in the art without departing from the spirit and scope of the invention as defined in the claims. Therefore, it is understood that variations and modifications can be effected within the spirit and scope of the present invention.

What is claimed is:

1. A multiply paper structure comprising at least one non-cellulose ester fiber containing ply next to at least one ply made of a mixture of cellulose fibers and cellulose ester fibers having the properties of moldability at moderate temperature, printable, impermeable by aqueous medium at ambient temperature, biodegradability, and stiffness, said mixture comprising 50 wt % to 84 wt. % of said cellulose ester fibers and 50 wt. % to 16 wt. % of said cellulose fibers, based on the total weight of the cellulose ester fibers and cellulose fibers, and from 20 wt. % to 150 wt. %, per weight of cellulose ester fibers, of a plasticizer.

2. The multiply paper structure of claim 1, wherein said paper structure is formed from multiple plies of wet fibers integrally connected in the wet state and prepared on conventional paper-making machines, which are used for making multiply papers.

3. The multiply paper structure of claim 1, wherein said paper structure is in the form of paper or paperboard.

4. The multiply paper structure of claim 3, wherein said paperboard is linerboard, foodboard, and folding boxboard or carton board.

5. The multiply paper structure of claim 1, wherein said paper structure contains about 45 to about 70 weight percent plasticizer per weight of cellulose acetate fibers.

6. The multiply paper structure of claim 1, wherein said cellulose ester is cellulose acetate, cellulose propionate, cellulose acetate-propionate, or cellulose acetate butyrate.

7. The multiply paper structure of claim 1, wherein said plasticizer is selected from the group consisting of diacetin, triethylene glycol diacetate, triacetin, alkyl or aryl esters of citric acid, adipic acid, maleic acid, phthalic acid, organic esters of inorganic acid, and alkoxy alkyl esters of inorganic acids or of organic polybasic acids.

8. The multiply paper structure, as in claim 7, wherein said plasticizer is alkyl ester of citric acid.

9. A moldable article comprising at least one non-cellulose ester fiber containing ply next to at least one ply made of a mixture of cellulose fibers and cellulose ester fibers having the properties of moldability at moderate temperature, printable, impermeable by aqueous medium at ambient temperature, biodegradability, and stiffness, said mixture comprising 50 wt % to 84 wt. % of said cellulose ester fibers and 50 wt. % to 16 wt. % of said cellulose fibers, based on the total weight of the cellulose ester fibers and cellulose fibers, and from 20 wt. % to 150 wt. %, per weight of cellulose ester fibers, of a plasticizer.

* * * * *